J. ABBS & E. MATTHEWS.
HORSESHOE.
APPLICATION FILED MAR. 23, 1910.
977,993.
Patented Dec. 6, 1910.
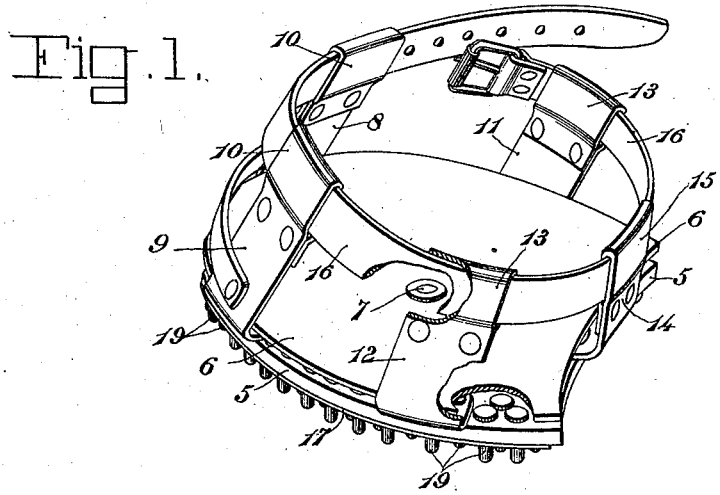
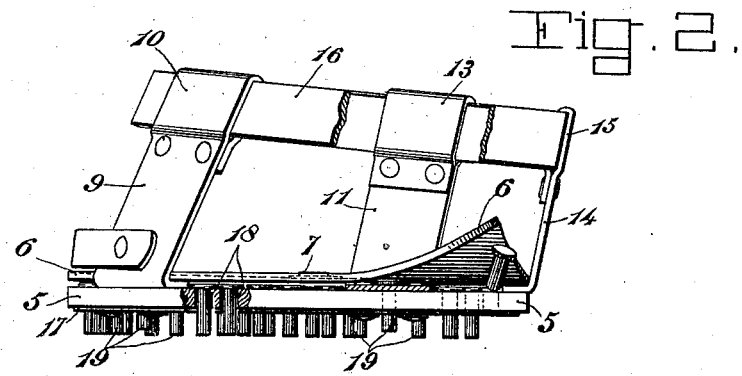
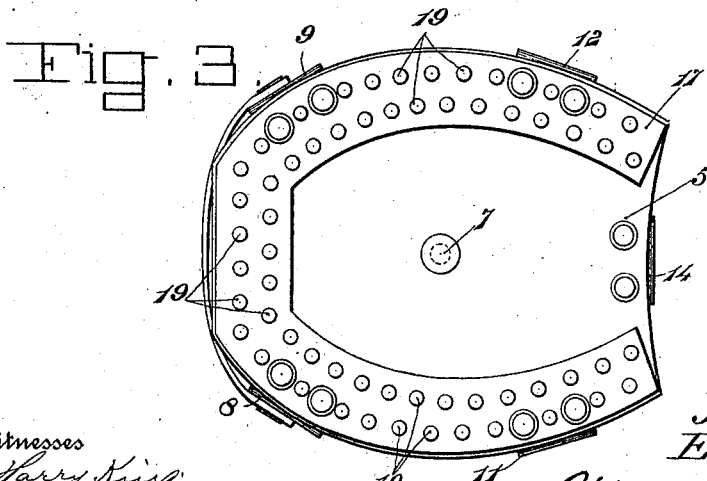

UNITED STATES PATENT OFFICE.

JAMES ABBS AND EDWARD MATTHEWS, OF PHILADELPHIA, PENNSYLVANIA.

HORSESHOE.

977,993. Specification of Letters Patent. Patented Dec. 6, 1910.

Application filed March 23, 1910. Serial No. 551,045.

*To all whom it may concern:*

Be it known that we, JAMES ABBS and EDWARD MATTHEWS, citizens of the United States, residing at Philadelphia, in the county of Philadelphia and State of Pennsylvania, have invented new and useful Improvements in Horseshoes, of which the following is a specification.

This invention relates to improvements in boots and has particular reference to that class of boots applied to horses' hoofs.

One object of the invention is the provision of a combined anti-slipping and lawn boot so constructed that a plurality of calks may be positioned on the boot when it is desired to use the same as an anti-slipping boot and may be readily withdrawn when it is desired to use the boot as a lawn boot.

Another object is the provision of a boot which may be readily attached to and detached from the hoof of a horse.

A further object is the provision of a boot provided with means whereby disengagement from the hoof of the animal will be positively prevented when the boot has been positioned and secured thereon.

With these and other objects in view, which will more fully hereinafter appear, the present invention consists in certain novel details of construction and arrangement of parts, hereinafter fully described, illustrated in the accompanying drawings and more particularly pointed out in the appended claims, it being understood that various changes in the form, proportion, size, and minor details of the device may be made, within the scope of the appended claims, without departing from the spirit or sacrificing any of the advantages of the invention.

In the accompanying drawings, forming a part of the specification;—Figure 1 is a perspective plan view of the device. Fig. 2 is a side elevation with one of the side loops removed and showing the spaced relation of the marginal portions of the outer and inner soles. Fig. 3 is a bottom plan view of the device.

Similar numerals of reference are employed to designate corresponding parts throughout.

The outsole is designated by the numeral 5 and is preferably of leather and is shaped with the contour of the bearing portion of the animal's hoof and is somewhat greater in area than the area of the base of the hoof to which the device is to be applied.

The insole is designated by the numeral 6 and corresponds in shape and area to the outsole.

The outer and inner soles are secured together at their central portions by means of a rivet or bolt 7 passing through the said soles, as clearly shown in the drawings.

By the provision of a single securing means located at the central portions of the outer and inner soles it will be evident that the marginal portions of said soles may be sprung apart, as shown in Fig. 2.

The toe loops are designated by the numerals 8 and 9 and are arranged in spaced relation at the forward end of the boot and have their lower ends riveted or otherwise secured to the outer sole 5. The toe loops correspond approximately to the height of the animal's hoof and their upper end portions are bent over and fixedly secured, whereby eyes or loops 10 are provided.

The side loops are designated by the numerals 11 and 12 and are positioned at diametrically opposite points on the opposite sides of the boot and have their lower ends fixedly secured to the inner face of the outsole similarly to the toe loops. The upper ends of the loops 11 and 12 terminate in eyes 13. The side loops 11 and 12 are somewhat less in length than the toe loops, whereby the eyes 10 will bear on the upper portions of the opposite sides of the animal's hoof.

The heel loop is designated by the numeral 14 and corresponds approximately in length to the side loops and has its lower end portion riveted or otherwise secured to the medial portion of the rear end of the boot and is arranged on the inner face of the outsole, and has its upper end terminating in a loop or eye 15.

Passing through the loops or eyes is a tie strap 16 one end of which projects through one of the side loops and the opposite end of which projects through the adjacent toe loop, the said end projecting through the side loop having a buckle to receive the opposite end and so positioned that when the said opposite end is passed through the buckle and pulled the straps will be firmly clamped to the upper portion of the animal's hoof.

Arranged on the outer face of the outer sole 5 is a band 17 conforming to the shape of a horse-shoe and preferably formed of sheet metal. Formed in the band and adjacent to the outer and inner edges thereof and extending throughout the body of the band are a double series of openings which aline with a similar series 18 formed in the outer sole 5. Insertible through the openings 18 are calks 19 which comprise shank portions, the inner ends of which are provided with heads, which bear on the inner surface of the outer sole 5. The shanks will of course be greater in length than the combined thickness of the band and outer sole, so that when the heads bear on the inner surface of the outer sole the outer terminals of the shanks will contact with the ground.

It will be manifest that when the calks are positioned in the openings and the device is secured to the animal's hoof displacement of the parts will be positively prevented by the pressure produced on the inner sole by the weight of the animal, it being obvious that the inner sole will bear on the heads of the calks. Owing to the fact that the marginal edges of the soles are capable of being sprung apart it will be evident when it is desired to use the boot as a lawn boot that the same can be done by removing the calks after the soles have been sprung apart.

It will be evident when the calks are in position and the boot is used as a means for preventing the animal from slipping that the anti-slipping function, owing to the presence of a great number of calks will be considerably enhanced and with a minimum of weight.

From the foregoing, it is evident that we have provided a device which is comparatively simple in structure and inexpensive in manufacture, embodying few parts and these so arranged that the danger of derangement will be reduced to a minimum.

We claim:

1. In a combination lawn and anti-slipping boot, an outer sole and an inner sole fixedly secured together at their central portions whereby their marginal portions may be sprung apart, the said outer sole being provided with a plurality of marginal openings, a plurality of calks having shank portions passable through said openings and head portions to bear on the said inner sole, and means for securing the soles to a hoof.

2. In a combination lawn and anti-slipping boot, an outer sole and an inner sole fixedly secured together at their central portions whereby their marginal portions may be sprung apart, a horse-shoe-shaped band arranged on the outer face of the outer sole and provided with a plurality of spaced openings to aline with similar openings formed in the said outer sole, a plurality of calks having shank portions passable through said openings and head portions to bear on said inner sole, and means for securing the soles to a hoof.

In testimony whereof we affix our signatures in presence of two witnesses.

JAMES ABBS.
EDWARD MATTHEWS.

Witnesses:
 Wm. M. Knatz,
 William Battin.